United States Patent [19]

Losic et al.

[11] Patent Number: 4,967,134

[45] Date of Patent: Oct. 30, 1990

[54] SYNTHESIS OF LOAD-INDEPENDENT AC DRIVE SYSTEMS

[76] Inventors: Novica A. Losic, 7802-23 Ave., Kenosha, Wis. 53140; Ljubomir D. Varga, Deskaseva 6, 11000 Belgrade, Yugoslavia

[21] Appl. No.: 316,664

[22] Filed: Feb. 27, 1989

[51] Int. Cl.[5] ............................................. H02D 5/00
[52] U.S. Cl. ................................... 318/802; 318/714; 318/811; 318/650; 388/811
[58] Field of Search ........................ 318/599, 714–715, 318/721–724, 737, 798–812, 650, 652–655, 560; 388/800–801, 809–815

[56] References Cited

U.S. PATENT DOCUMENTS

| | | | |
|---|---|---|---|
| 3,896,356 | 6/1974 | Hoffman et al. | 318/802 |
| 4,384,244 | 5/1983 | Matsumoto | 318/811 X |
| 4,622,500 | 11/1986 | Budelman, Jr. | 318/599 X |
| 4,623,827 | 11/1986 | Ito | 318/599 X |
| 4,743,821 | 5/1988 | Hall | 318/599 |
| 4,757,241 | 7/1988 | Young | 318/599 X |
| 4,831,317 | 5/1989 | Sakamoto et al. | 318/599 |

OTHER PUBLICATIONS

Hostetter G., Savant C., Stefani R., "Design of Feedback Control Systems", 1982, pp. 3–5.
Sinha N., "Control Systems", 1986 pp. 59–70.
Kuo, Benjamin, "Automatic Control Systems", 1982, pp. 3–16.
Dubey, Gopal, "Power Semiconductor Controlled Drives", 1989, pp. 275–278, 313–319, 335–338, 342–345 and 379–381.
Hulley, L. N. and Shepherd, W., "Power Electronics and Motor Control", 1987, pp. 261–264.
Rashid, M., "Power Electronics", 1988 pp. 364–369 and 376–378.

Primary Examiner—Vit W. Miska
Assistant Examiner—David Martin

[57] ABSTRACT

A method of synthesizing load invariant ac synchronous and asynchronous motor drive systems comprising positive stator current feedback of exactly specified nature and value of its transfer functions. The system transfer function independent of load is realized while stability and dynamics of the system are controlled by additional voltage loop.

6 Claims, 4 Drawing Sheets

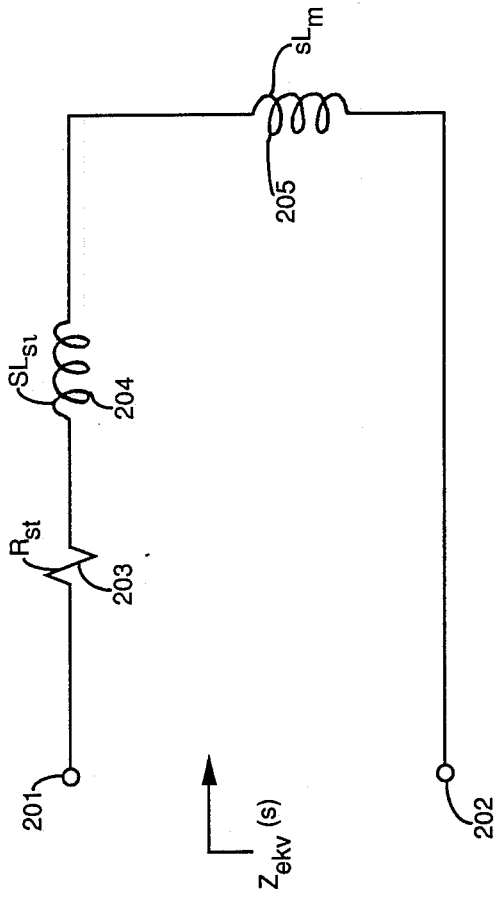
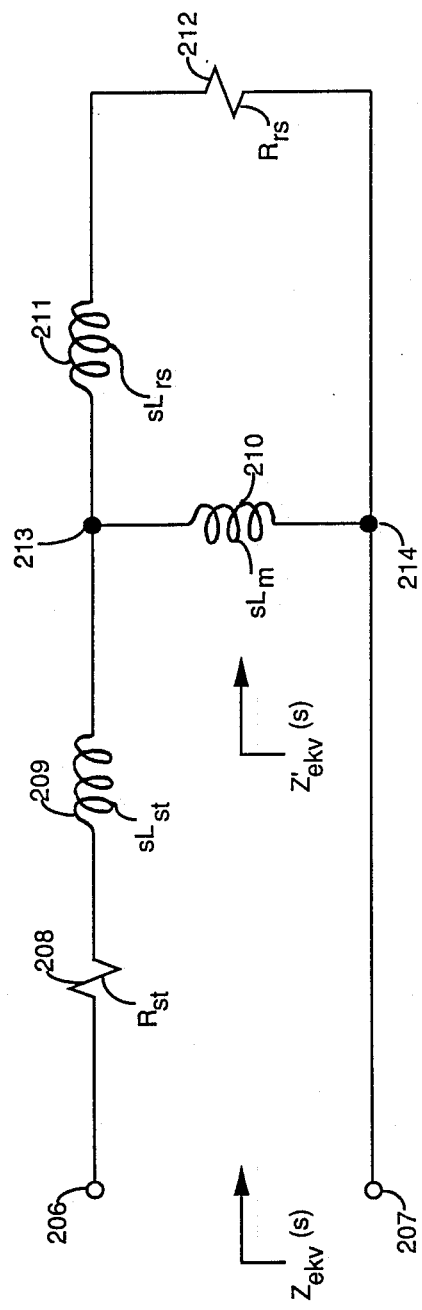

SYNTHESIS OF LOAD-INDEPENDENT AC DRIVE SYSTEMS

FIELD OF THE INVENTION

This invention relates to ac drive systems and more particularly to both synchronous and a synchronous (induction) motor drive systems using both current and voltage feedback loop to control the output angular position and velocity of the motor shaft when load torque changes by making the system independent of the load.

BACKGROUND OF THE INVENTION

Previous studies show the classical approach of using only negative feedback in controlling dynamic and steady-state performance of control systems. See, for example, N. K. Sinha, "Control Systems", Holt, Rinehart and Winston, 1986, pp. 59–70, G. H. Hostetter et al, "Design of Feedback Control Systems", Holt, Rinehart and Winston, 1982, pp. 3–5, B. C. Kuo, "Automatic Control Systems", Prentice-Hall, INc., 4th Ed., 1982, pp. 3–16.

In the field of drive systems including ac drives this classical approach is maintained as seen from G. P. Dubey, "Power Semiconductor Controlled Drives", Prentice Hall, INc., 1989, pp. 275–278, 313–319, 335–338, 342–345, and 379–381, W. Shepherd & L. N. Hulley, "Power Electronics and MOtor Control", Cambridge University Press, 1987, pp. 261–264, and M. H. Rashid, "Power Electronics: Circuits, Devices, Applications", Prentice-Hall, Inc., 1988, pp. 364–369, and 376–378.

In the particular area of high-performance ac synchronous and induction motor drives a complex algorithm of field-oriented (vector-controlled) motor control had been used to control the ac motor developed torque and reduce the effects of load torque disturbances. In addition to being complex, which directly contributes to the complexity of an ac drive system of high performance and thus to the system costs, the algorithm does not provide load independence.

The ultimate load regulation performance in drive systems should be invariant to the change of load and limited only by the physical properties of the system, such as the finite energy level of available sources, the finite power dissipation capability of available components and the finite speed of transition of control signals. Such an ultimate performance has not been achieved using the classical approach of negative feedback and augmenting the control algorithm with advanced non-linear/adaptive techniques.

SUMMARY OF THE INVENTION

It is therefore an object of the present invention to provide a control method and associated circuit to achieve complete load independence in ac drive systems with both synchronous and induction motors.

Another object of the present invention is to provide a control circuit which is simple.

Briefly, for use with an ac drive system, the preferred embodiment of the present invention includes a positive stator current feedback loop closed within a negative voltage feedback loop, the transfer function of the feedback network in the current loop synthesized in an exact relation to the motor parameters.

The transfer function of the feedback network in the current loop, as the algorithm of this novel method, for which the system becomes load independent is given as $$H(s) = Z_{ekv}(s)[R_4/R_3)A] \quad (1)$$

where $Z_{ekv}(s)$ is equivalent impedance per phase of ac motor referred to stator, R is transresistance of the current-sense device, $R_4/R_3$ is gain constant of isolating differential amplifier in the stator current sensing circuit, and A is voltage gain of PWM control and power stage.

The equivalent impedance per phase $Z_{ekv}(s)$ in Eq. (1) consists of stator resistance $R_{st}$ and synchronous reactance $sL_{st}$ for synchronous motor $$Z_{ekv}(s) = R_{st} + sL_{st} \quad (2)$$

where $L_{st} = L_{sl} + L_m$; $L_{sl}$ is stator leakage inductance and $L_m$ is magnetizing inductance.

In case of induction motor, the equivalent impedance per phase $Z_{ekv}(s)$ of Eq.(1) consists of stator resistance $R_{st}$ and reactance $sL_{st}$ combined with magnetizing reactance $sL_m$ and rotor impedance referred to stator consisting of resistance $R_{rs}$ and reactance $sL_{rs}$ $$Z_{ekv}(s) = [R_{st} + sL_{st}] + [(sL_m)|(R_{rs} + sL_{rs})] \quad (3)$$

where symbol | denotes a parallel connection.

It is seen from Equations (1) and (2) that for synchronous motor the transfer function of feedback network in the current loop is synthesized as derivative and proportionate where these two terms are easily realized using a differentiator circuit with a dc path.

In case of induction motor, it is seen from Equations (1) and (3) that the transfer function of feedback network in the current loop is synthesized as a more complex circuit the exact design of which is given in the detailed description section.

The ability to provide a load-independent ac drive systems, employing synchronous or induction motor, the performance of which is invariant to the changes of the load torque in both steady state and transient (infinite static and dynamic stiffness), is a material advantage of the present invention.

Other advantages of the present invention include its ability to be realized in an integrated-circuit (IC) form; the provision of such a method which simplifies design of negative voltage feedback loop for optimum system performance; and the provision of such a method which provides zero output-angular-change-to-load-torque-change transfer function.

As it will be shown in the detailed description section, the load independence is achieved due to the prescribed control action in the positive stator current feedback loop which takes place in its own domain without being concerned with the actual internal working mechanisms of the machine in terms of producing its torque, or with the other control algorithms used in controlling the system (these algorithms, as mentioned in the section dealing with background of the invention, are based on complex field-oriented vector control method for present high-performance ac drive systems). This implies a possibility of great simplification in controlling a high-performance ac drive systems by simplifying the control algorithm used and, at the same time, achieving ultimate load independent operation not previously attained. This certainly is a big advantage by itself.

These and other objects and advantages of the present invention will no doubt be obvious to those skilled in the art after having read the following detailed description of the preferred embodiment which is illustrated in the FIGURES of the drawing.

BRIEF DESCRIPTION OF THE DRAWING

FIGS. 2a–2b are schematic diagrams illustrating equivalent impedance per phase of synchronous and induction motor, respectively;

DETAILED DESCRIPTION

Figure 1:
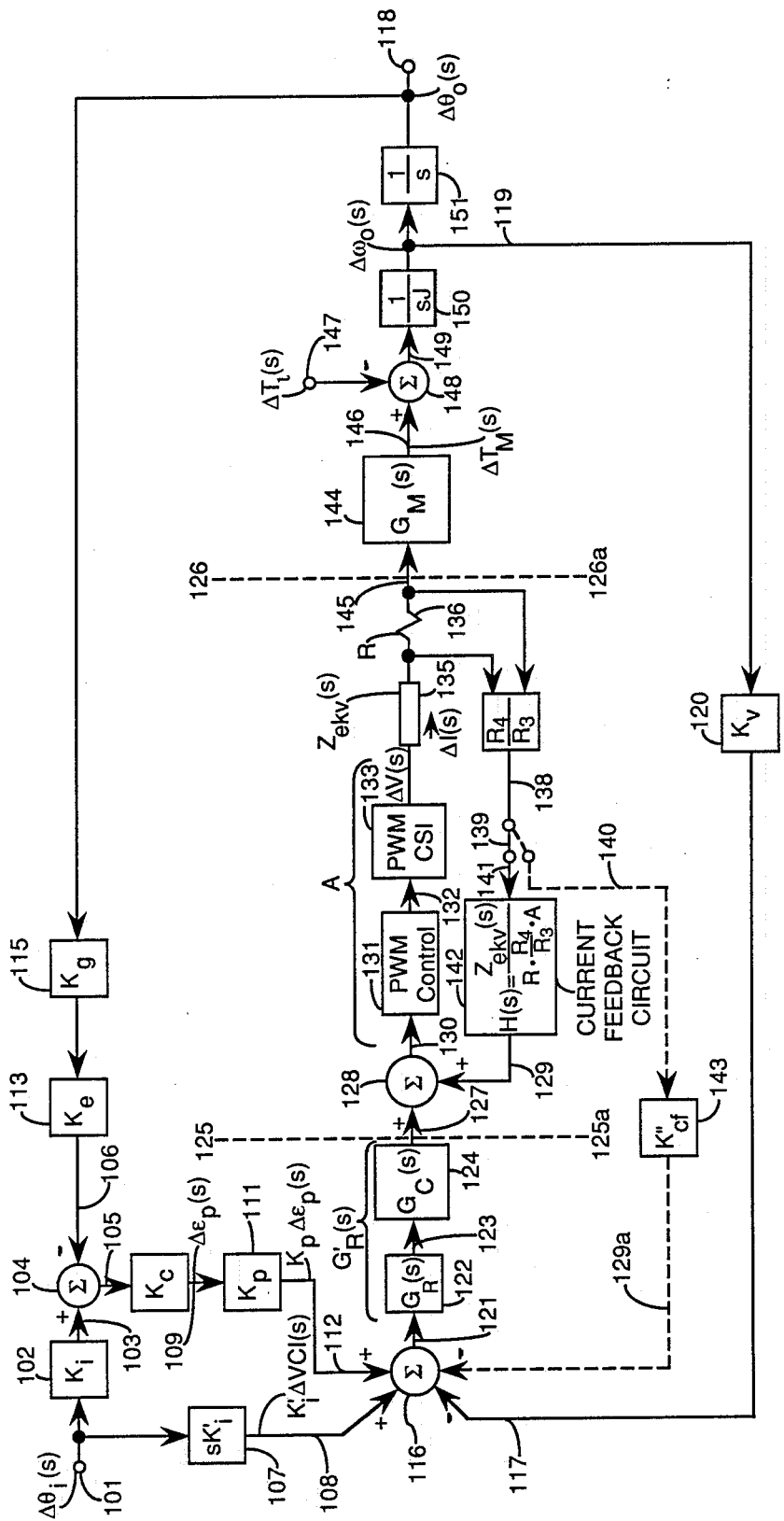
FIG. 1 is a block diagram of the presently preferred embodiment in accordance with the present invention.

An ac drive system embodying the principles of the invention is shown in FIG. 1. In FIG. 1, it is assumed that input voltage $V_{in}$ (not illustrated) applied to the power stage 133 is constant so that gain constant A characterizes transfer function of the PWM control 131 and power stage 133. The power stage 133 may be implemented as either current source inverter (CSI) or voltage source inverter. The PWM control 131 may use either sinusoidal or any other type of control suitable for generating ac reference signal synthesized using PWM techniques. The ac signal applied to lead 130 is voltage-amplified A times to appear as the stator voltage $\Delta V(s)$ on lead 134 with an associated power/current $\Delta I(s)$ supplied by the input voltage source $V_{in}$. The system in FIG. 1 between the boundaries 125–125a and 126–126a is per-phase based.

The ac drive system in FIG. 1 incorporates an inner positive stator current feedback loop within velocity and position negative feedback loops. The inner positive stator current feedback loop incorporates current feedback circuit 142 which is an active network whose transfer function is H(s). A microprocessor realization of the current feedback circuit 142 may be done as well. The purpose of the positive current feedback loop is to make the system load invariant, which it does for the transfer function H(s) synthesized as given in Eq. (1) and shown in FIG. 1 as it will be explained shortly. The purpose of negative voltage (velocity/position) feedback loop(s) is to stabilize the system and control its dynamics by means of the filtering and stabilizing network 122 and a control block 124.

In operation, the output angular velocity and position of the motor shaft are monitored by tach 120, characterized by a constant $K_v$[V/rev/min], and encoder 113, characterized by a constant $K_e$[pulses/rad], respectively. In general, a gear box may be used in the position loop; a block 115, characterized by a constant $K_g$, denotes a gear box in FIG. 1. The velocity and position feedback signals may alternatively be derived from a single feedback measuring device by appropriate differentiation/integration, without changing the principles of operation of the embodiment. The velocity, whose incremental Laplace transform is $\Delta\omega_0(s)$, is monitored through lead 119 by tach 120 and the velocity feedback signal is applied by lead 117 to summer 116 to close the negative feedback loop. The velocity command voltage, whose incremental Laplace transform is $K_i'\Delta VCI(s)$, is obtained by differentiating the position command by means of block 107, characterized by transfer function $sK_i'$. The velocity command voltage is applied by lead 108 to the summer 116 where it is summed with the position error voltage, whose incremental Laplace transform is $K_p\Delta\epsilon_p Ac(s)$ and which is applied by lead 112 to the summer 116. The position error voltage, whose incremental Laplace transform is $K_p\Delta\epsilon_p(s)$, produced by the phase/frequency detector which counts in opposite directions position feedback pulses supplied by lead 106 and position command pulses supplied by lead 103 into the counter (functionally represented as an algebraic summer) 104, so that a number of pulses corresponding to the position error is supplied by lead 105 to a D/A converter 110 whose gain is $K_c$[V/pulses] and whose output 109 provides the position error in an analog form. Block 111, characterized by a constant $K_p$, represents a gain constant in the position loop. The motor stator current, whose incremental Laplace transform is $\Delta I(s)$, is measured by a current sense device 136 whose transresistance is R. The current sense voltage is buffered and amplified $R_4/R_3$ times in differential amplifier 137. The output of the differential amplifier 137 is connected by means of lead 138 to switch 139. The switch 139 is used here for conceptual distinguishing between a standard high-performance ac drive system and the preferred embodiment in that when switch 139 is thrown into position so as to connect lead 138 to lead 140 a standard high-performance ac drive system is implemented and when switch 139 connects lead 138 to lead 141 the preferred embodiment is implemented. In a concrete realization of a preferred embodiment line 138 is permanently connected to line 141 and the dashed path consisting of leads 140 and 129a and block 143 is not in use. Therefore, for standard high-performance ac drive system, switch 139 is thrown so as to connect lead 138 to lead 140 and the stator current sense voltage buffered and amplified $R_4/R_3$ times is applied to a constant gain block 143 whose gain is $K_{cf}'$. The output of block 143 is connected by lead 129a to summer 116 to close the negative stator current feedback loop. The resulting error voltage at the output of the summing circuit 116 is applied by lead 121 to filtering and stabilizing network 122 characterized by transfer function $G_R(s)$. The output of the filtering and stabilizing network 122 is applied by lead 123 to a control circuit 124 characterized by transfer function $G_C(s)$. For high-performance ac drive systems with either a synchronous or a synchronous (induction) motor the control block 124 is used to implement a field-oriented vector control algorithm in either direct or indirect form. It is then assumed that block 124 may receive other (feedback-measured/calculated) signal information but this does not interfere with the principles of operation of the preferred embodiment. The input to block 124 is a varying dc control voltage. The output of block 124 supplies a controlled sinewave voltage. For a three-phase ac motor there are three outputs of block 124, each output supplying one of the phases of a controlled sinewave voltage. The output of block 124 is conceptually given in a form of a single lead 127 and it is understood that, as mentioned earlier in this section, the system in FIG. 1 between the boundaries 125–125a and 126–126a is per-phase based. In a standard high-performance ac drive system the control signal available on lead 127 is directly applied by lead 130 to PWM control block 131 because the switch 139 disconnects current feedback circuit 142 from operation. The output of the PWM control block 131 is applied by lead 132 to a PWM power converter 133 which may be realized as current source inverter (CSI). The specific realization of the power converter 133 is not of importance for the functioning of the preferred embodiment. The only parameter of importance, in connection with the PWM control 131 and power 133 stage, is their combined voltage gain A. The power converter 133 produces PWM voltage waveform at its output 134. The fundamental component of the waveform is a sinusoidal waveform. The incremental Laplace transform of the voltage waveform at the output 134 of the power converter 133 is denoted as $\Delta V(s)$ and the corresponding stator current, whose incremental Laplace transform is $\Delta I(s)$, is flowing through the equivalent impedance $Z_{ekv}(s)$ of the stator winding 135. The equivalent impedance of the stator winding $Z_{ekv}(s)$ in case of synchronous and asynchronous motor is described later, in connection with FIGS. 2a-2b. After passing through the current sense device 136, the stator current is inherently involved in developing the ac motor torque. This process of developing torque of the ac motor be it synchronous or induction, is functionally represented by block 144 whose input is total stator current in lead 145. Block 144 is characterized by transfer function $G_M(s)$ and it denotes inherent (and intricate) mechanisms involved in producing a torque of an ac motor. It is well known that, as mentioned in the section dealing with the background of the invention, the torque producing mechanisms in an ac machine can be modeled with an appropriate decoupling of the total stator current into a direct (field-Producing) and a quadrature (torque-producing) component (d-q transformation/decoupling) in a coordinate system of rotating rotor magnetic field, and, consequently, the ac motor torque is developed through an inherent manipulation of the d and q components. The final outcome of this manipulation is the developed torque of the ac motor. The incremental Laplace transform of the motor torque is $\Delta TM(s)$. The motor torque is opposed by the load torque whose incremental Laplace transform is $\Delta T_f(s)$ This opposition is functionally represented by applying the load torque at point 147 into the summer 148 with sign opposite of that of motor torque which is applied by lead 146 to summer 148. The difference of the two torques is applied by lead 149 to block 150 whose transfer function is 1/sJ where J is a moment of inertia of motor and load. The output angular velocity, whose incremental Laplace transform is $\Delta \omega_o(s)$, is produced at the output of block 150. By integrating the angular velocity the output angular position of the rotor shaft is produced. This is done in block 151, characterized by transfer function 1/s, so that the output angular position, whose incremental Laplace transform is $\Delta \theta_o(s)$, is available at point 118. In FIG. 1, blocks 144, 148, 150, and 151 constitute equivalent circuit of an ac motor, be it synchronous or induction, for input variable being total stator current and output variables being motor angular velocity and angular position. It is seen that the topological point of entry of the disturbance to the system is inside of the motor equivalent circuit. This fact is one of the reasons for difficulties present in achieving optimum system performance for both outside load torque disturbance and response to input position/velocity command. As a matter of fact, standard high-performance systems do not provide for optimum performance with respect to the load torque disturbance, and they do not provide load independence at all. Another reason why this is so is in use of only negative feedback in standard systems in which case load independence cannot be achieved because of the finite loop gain required for stability.

To describe the operation of the preferred embodiment, incorporating the principles of the load independence, we shall return to the system illustrated in FIG. 1 and note that the (conceptual) switch 139 is thrown such that lead 138 is connected to either lead 140 (for standard system) or lead 141 (for the preferred embodiment). In case of the standard system (lead 138 connected to lead 140) a dynamic stiffness which is defined as a measure of displacement in transient of output shaft angular position $\Delta \theta_o(t)$ due to a load torque disturbance $\Delta T_f(t)$, for input angular position command change $\Delta \theta_i(t) = 0$) is expressed in Laplace domain as $$S_{dcf}(s) = -\Delta T_f(s)/\Delta \theta_o(s) \tag{4}$$

With reference to FIG. 1, in which input position command change, whose incremental Laplace transform is $\Delta \theta_i(s)$ and which is applied at point 101 and processed by block 102 with gain constant $K_i$, according to the stiffness definition is set to zero, Eq. (4) becomes $$S_{dcf}(s) = [T_1(s) + T_2(s)]/T_3(s) \tag{5}$$

where, for $R << \text{Real}\{Z_{ekv}(s)\}$ (5)

$$T_1(s) = AG_M(s)G_R'(s)[K_gK_eK_cK_p + sK_v]$$

$$T_2(s) = s^2J[T_3(s)]$$

$$T_3(s) = [Z_{ekv}(s) + G_R'(s)AK_{cf}'K_{cf}''] \tag{6}$$

where $G_R'(s)$ is transfer function of the cascade connection of blocks 122 and 124, and $$K_{cf}' = R(R_4/R_3) \tag{7}$$

while the other parameters and functions were explained previously.

From Eq. (5) it is seen that the system becomes load independent for $T_3(s) = 0$. Substituting this requirement into Eq. (6) yields for the gain function characterizing the stator current feedback circuit and given originally in Eq. (6) as a constant, a complex function $$K_{cf}''(s) = -[Z_{ekv}(s)]/[G_R'(s)AK_{cf}'] \tag{8}$$

With reference to FIG. 1 and substituting Eq. (7), Eq. (8) implies that the load independence of ac drive system is achieved by closing an inner positive stator current feedback loop, within the negative velocity and position feedback loops, incorporating current feedback circuit 142 whose transfer function is synthesized as given in Eq. (1) and shown in FIG. 1 and repeated here $$H(s) = Z_{ekv}(s)/[R(R_4/R_3)A].$$

With reference to FIG. 1, the load invariance is effected with switch 139 connecting leads 138 and 141, in which case a positive stator current feedback signal of required instantaneous value and phase is produced at the output of the current feedback circuit 142, characterized by transfer function H(s), and fed by means of lead 129 into summer 128 to add to the control signal provided by lead 127, so that the total control signal is applied by lead 130 to the PWM control circuit 131.

The signals on leads 129, 127, and 130 are sinusoidal, with the same frequency as the frequency of the stator current which flows through the stator equivalent impedance 135. In case of a three phase ac motor it is not necessary to implement current feedback circuit 142 in each phase but only in two because the third control sinusoidal signal, provided by lead 130, for the third phase of a three-phase isolated-neutral system, is easily derived from the condition of zero sum by summing the two control signals from lines 130 of two phases and providing the sum with inverted sign to the line 130 of the third phase.

In order to implement Eq. (1), as the algorithm of the preferred embodiment of the present invention, the equivalent motor impedance $Z_{ekv}(s)$ has to be found. Before leaving description of the preferred embodiment illustrated in FIG. 1, however, we find it worth noting that FIG. 1 actually represents a block diagram applicable to either ac or dc drive systems in that it models a "premachine". For example, if FIG. 1 is used to represent a high-performance dc drive system then $G_M(s) = K_t$ where $K_t$ is a torque constant of the dc motor; $G_C(s) = K$ where K is a constant; $Z_{ekv}(s) = R_a + sL_a$ where $R_a$ and $L_a$ are the armature resistance and inductance, respectively; and, of course, the PWM control and inverter stage are replaced by an appropriate PWM control and chopper stage characterized by a voltage gain A. It is also seen from FIG. 1 that the load independence is achieved due to the prescribed control action in the positive stator current feedback loop, which takes place in its own domain without being concerned with the actual internal working principles of the machine in terms of producing its torque (characterized by $G_M(s)$) or with the other control algorithms used in controlling the system (the control algorithm is characterized by block $G_C(s)$ and, as mentioned, for high-performance ac drives it is implemented in form of a field-oriented algorithm). The control action prescribed for load independence is in effect between 125–125a and 126–126a boundaries in FIG. 1: outside of the mechanisms of producing the torque of the actual machine as well as outside of the means of otherwise controlling the machine. As stated in the summary of the invention, this implies a possibility of great simplification in controlling a high-performance ac drive systems by simplifying the control algorithm used and, at the same time, achieving ultimate load independent operation not previously attained.

To realize Eq. (1) in circuit form, the equivalent motor impedance $Z_{ekv}(s)$ is found for the motor which is used. FIG. 2a shows the circuit diagram of the equivalent motor impedance $Z_{ekv}(s)$ in case of a synchronous motor while FIG. 2b shows the circuit diagram of the equivalent motor impedance $Z_{ekv}(s)$ in case of an asynchronous (induction) motor. It should be emphasized at this point that the algorithm of the preferred embodiment, given in Eq. (1), deals with the equivalent impedance, $Z_{ekv}(s)$, and not with the equivalent circuit of the motor. This is to say that the effects of induced voltage in the armature of, say, synchronous motor, due to the field of the rotor circuit, are of no consideration for this algorithm. The equivalent motor impedance $Z_{ekv}(s)$, involved in Eq. (1), is found as the impedance seen between the two stator terminals for field (excitation) source removed (open-circuited in case of current source representation, or short-circuited in case of voltage source representation of the excitation source). Therefore, in case of synchronous motor, the equivalent motor impedance is found from FIG. 2a as the impedance seen when looking between terminals 201 and 202, $Z_{ekv}(s)$. The impedance consists of the series connection of stator resistance 203 whose value is $R_{st}$, and synchronous reactance whose value is $sL_{st}$, where synchronous reactance consists of series connection of stator leakage reactance 204, whose value is $sL_{sl}$, and magnetizing reactance 205, whose value is $sL_m$. The impedance $Z_{ekv}(s)$, obtained in this way, is per-phase based in case of three phase synchronous motor. Its value has been given in the summary of the invention in Eq. (2) and is repeated here $$Z_{ekv}(s) = R_{st} + sL_{st}, \text{ where } L_{st} = L_{sl} + L_m.$$

In case of induction motor, the equivalent impedance per phase $Z_{ekv}(s)$ is obtained from FIG. 2b as the impedance seen when looking between terminals 206 and 207. The impedance consists of the series connection of stator resistance 208, whose value is $R_{st}$, stator reactance 209, whose value is $sL_{st}$, and an impedance $Z_{ekv}'(s)$. The impedance $Z_{ekv}'(s)$ is obtained when looking between points 213 and 214 and it consists of parallel connection of magnetizing reactance 210, whose value is $sL_m$, and rotor impedance referred to stator consisting of series connection of stator referred reactance 211, whose value is $sL_{rs}$, and stator referred resistance 212, whose value is $R_{rs}$. In obtaining impedance $Z_{ekv}(s)$ the resistance representing excitation (or core) loss and connected in parallel with the magnetizing reactance 210, was removed from the equivalent impedance model as, for all practical purposes, its effects are negligible. The value of the equivalent impedance of the induction motor, obtained in the way described, has been given in the summary of the invention in Eq. (3) and is repeated here $$Z_{ekv}(s\ [R_{st} + sL_{st}] + [(sL_m) | (R_{rs} + sL_{rs})].$$

The rotor resistance referred to stator $R_{rs}$ is a function of slip $s_l$ $$R_{rs} = R_{rs}'/s_l, \text{ where } s_l = \omega_{slip}/\omega_{syn}, \omega_{slip} = \omega_{syn} - \omega_o,$$
$$\omega_{syn} = (2/p)\omega_{st}, \text{ p = pole number,}$$

where $\omega_o$ and $\omega_{st}$ denote rotor (output) angular speed and stator supply angular frequency, respectively. By employing variable frequency operation of the stator supply through the use of the PWM controlled inverter, the slip angular frequency $\omega_{slip}$ can be made small so that the motor operates at small and virtually constant slip $s_l$ at all speeds. On the other side, the slip $s_l$ is constant in presence of a load disturbance due to the load invariance algorithm provided by the preferred embodiment. This implies independence of Eq. (3) from the slip $s_l$. Furthermore, it will be shown that, in practical realization of the preferred embodiment, effects of changes of rotor parameters are nullified by operating at near zero slip $s_l$.

Figure 3:
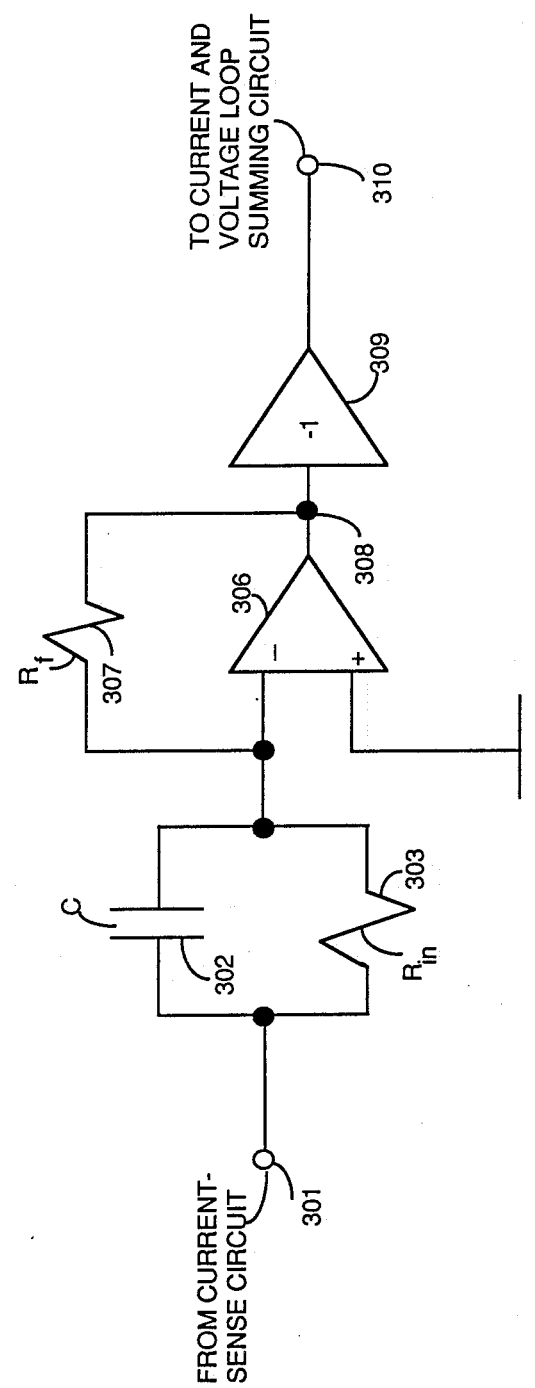
FIG. 3 is a schematic diagram of a current feedback circuit included in the system shown in FIG. 1, for case of synchronous motor.

The schematic diagram of a current feedback circuit 142, included in the diagram of FIG. 1 and characterized by transfer function H(s) of Eq. (1), is shown in FIG. 3 for case of a synchronous motor used in the ac drive system. The buffered and amplified current sense signal voltage is applied to terminal 301 to which capacitor 302 of capacitance C and resistor 303 of resistance $R_{in}$ are tied together. The other ends of capacitor 302 and resistor 303 are connected to the inverting input terminal of operational amplifier 306 whose noninverting input terminal is grounded. In the negative feedback path of operational amplifier 306 resistor 307 of resistance $R_f$ is connected. The output of operational amplifier 306 is connected by lead 308 to an inverter circuit which is symbolically represented by circuit 309 whose transfer function is $-1$ and whose output provides the required proportional and derivative component of the current signal at terminal 310. The current feedback circuit component values for capacitance C, and resistances $R_{in}$ and $R_f$ are designed according to design equations provided by the synthesis method described earlier. The transfer function of the current feedback circuit of FIG. 3 from its input 301 to its output 310 is $$H(s) = (R_f/R_{in})(1 + sCR_{in}) \qquad (9)$$

The design equations are obtained by first substituting Eq. (2) into Eq. (1) and then equating Eq. (1) with Eq. (9) yielding $$R_f/R_{in} = R_{st}/[R(R_4/R_3)A] \text{ and } CR_{in} = L_{st}/R_{st}.$$

Using these design equations for synthesizing current feedback circuit of FIG. 3, the appropriate form and amount of current feedback signal is provided at the output terminal 310 of the current feedback circuit to provide load independence of the ac synchronous motor drive system of FIG. 1.

Figure 4:
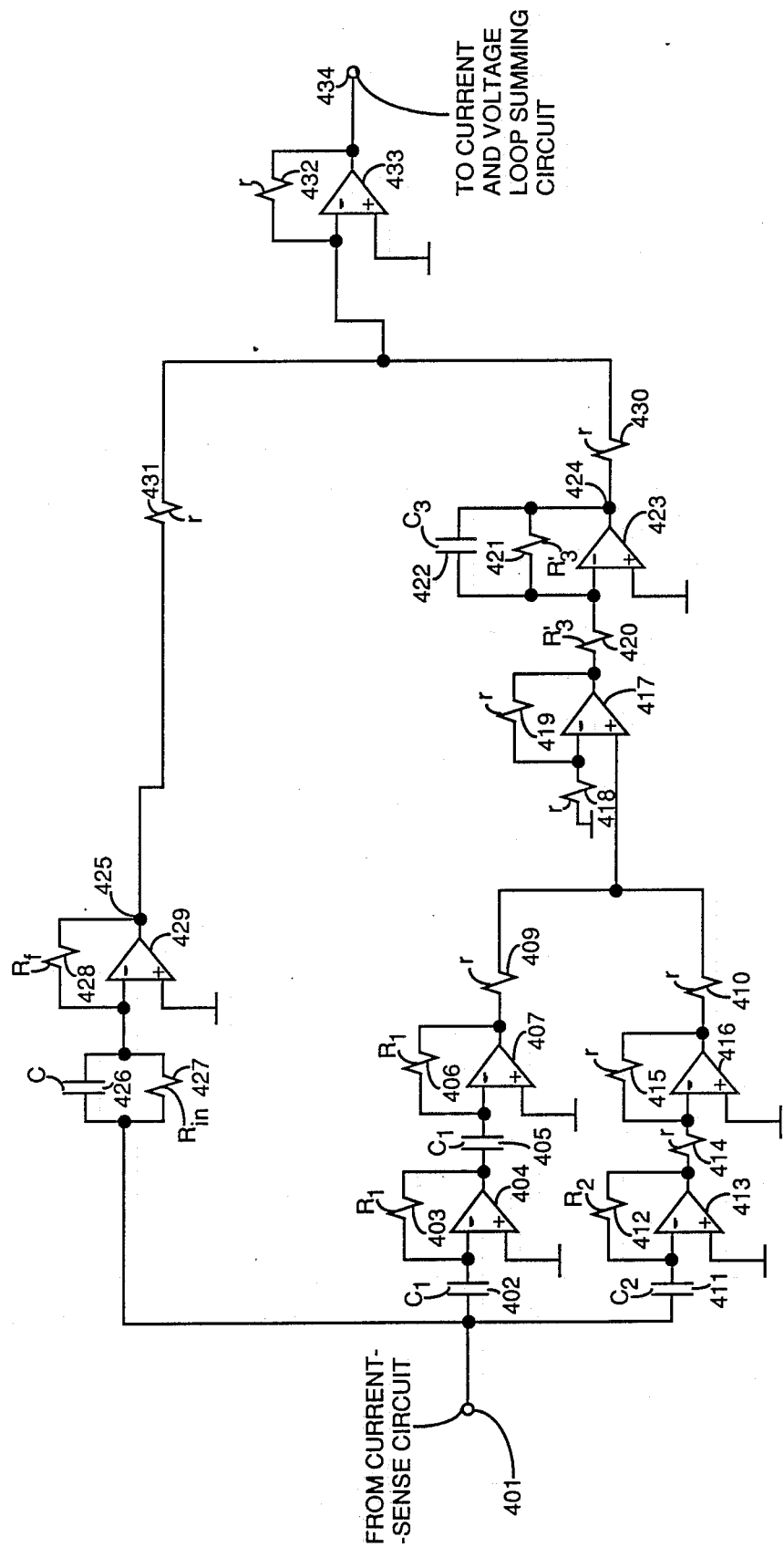
FIG. 4 is a schematic diagram of a current feedback circuit included in the system shown in FIG. 1, for case of induction motor.

In case of ac induction motor drive system, the schematic diagram of a current feedback circuit 142, included in the diagram of FIG. 1 and characterized by transfer function H(s) of Eq. (1), is shown in FIG. 4. The buffered and amplified current sense signal voltage is applied to terminal 401 to which three leads are connected: the lead which connects a parallel connection of capacitor 426, whose value is C, and resistor 427, whose value is $R_{in}$; the lead which connects input terminal 401 with capacitor 402, whose value is $C_1$; and the lead which connects input terminal 401 with capacitor 411, whose value is $C_2$. The first lead, which connects input terminal 401 with parallel circuit consisting of capacitor 426 and resistor 427, is in the path which processes stator circuit effects. The remaining two leads, which connect input terminal 401 with capacitors 402 and 411, respectively, are in the path which processes rotor circuit effects. In the path which processes stator circuit effects, the parallel connection of capacitor 426 and resistor 427 is connected with its other end to the inverting input of operational amplifier 429 whose noninverting input is grounded. The operational amplifier 429 has in its negative feedback connected resistor 428, whose value is $R_f$. In the path which processes rotor circuit effects, capacitors 402 and 411 are connected with their other ends to the inverting inputs of operational amplifiers 404 and 413, respectively, whose noninverting inputs are grounded. The operational amplifiers 404 and 413 have in their negative feedbacks connected resistors 403 and 412, whose values are $R_1$ and $R_2$, respectively. The output of operational amplifier 404 is connected via capacitor 405, whose value is $C_1$, to the inverting input of operational amplifier 407, while the output of operational amplifier 413 is connected to the inverting circuit consisting of operational amplifier 416 and two resistors 414 and 415 of identical values r. The operational amplifier 407 has in its negative feedback connected resistor 406, whose value is $R_1$. The noninverting inputs of both operational amplifiers 407 and 416 are grounded. The outputs of the operational amplifiers 407 and 416 are summed in operational amplifier 417 which is connected as a noninverting summing circuit consisting of the amplifier 417 and appropriately connected resistors 409, 410, 418, and 419, of identical values r. The output of operational amplifier 417 is connected via resistor 420, whose value is $R_3$, to the inverting input of operational amplifier 423, whose noninverting input is grounded. The parallel circuit consisting of capacitor 422, whose value is $C_3$, and resistor 421, whose value is $R_3'$, is connected in the negative feedback path of operational amplifier 423. The effects of stator circuit, processed and available at point 425, and the effects of rotor circuit, processed and available at point 424, are summed in the inverting summing circuit consisting of the operational amplifier 433 and appropriately connected resistors 431, 430, and 432, of identical values r. The noninverting input of operational amplifier 433 is grounded. The current feedback circuit provides the required processed current feedback signal at terminal 434. The current feedback circuit component values for capacitance C and resistances $R_{in}$ and $R_f$ in the path which processes stator circuit effects, as well as for capacitances $C_1$, $C_2$, $C_3$, and resistances $R_1$, $R_2$, and $R_3'$ in the path which processes rotor circuit effects, are designed according to design equations provided by the synthesis method described earlier. The design equations are obtained by substituting Eq. (3) in Eq. (1) which yields $$H(s) = [R_{st} + sL_{st}]/[R(R_4/R_3)A] + [a_1 s^2 + a_2 s]/[a_3 s + 1]$$

where
$a_1 = [L_m L_{rs}]/[R(R_4/R_3)AR_{rs}]$
$a_2 = [L_m]/[R(R_4/R_3)A]$
$a_3 = [L_m + L_{rs}]/R_{rs}$.

The stator path design equations therefore become $$R_f/R_{in} = R_{st}/[R(R_4/R_3)A]$$

$$CR_{in} = L_{st}/R_{st}.$$

The rotor path design equations become $$C_1 R_1 = \sqrt{a_1}$$

$$C_2 R_2 = a_2$$

$$C_3 R_3' = a_3.$$

Before leaving description of the current feedback circuit used to provide load independence of an induction motor drive system, as shown in FIGS. 1 and 4, we find it worth noting that in FIG. 4, which represents an actual circuit realization of block 142 of FIG. 1, the path which processes stator circuit effects provides both instantaneous (without phase delay) steady state and ac (with phase delay) steady state and transient components, while the path which processes rotor circuit effects provides ac steady state and transient components. It is also seen from FIG. 4 that for operation of induction motor at near zero slip $s_l$, i.e. for resistance $R_{rs}$ of very high value, the signal processing in double differentiator circuit involving capacitances $C_1$ is virtually discontinued, and the integration due to capacitance $C_3$ is virtually eliminated, too. The remaining processing, in case of operation at near zero slip $s_l$, is effected in the differentiating circuit due to capacitance $C_2$, and in the path which processes stator circuit effects. These two processing paths can be combined into a single one in which only the differentiator circuit with a dc path, consisting of operational amplifier 429 and the associated components 426, 427 and 428, and an inverter circuit remain. In such a case the design equations are $$R_f/R_{in} = R_{st}/[R(R_4/R_3)A]$$

$$CR_{in} = [L_{st} + L_m]/R_{st}.$$

The result above is actually the one which has been obtained in case of a synchronous motor, which is expected mode of operation of induction motor operating at near zero slip $s_l$. For such an operation, the rotor circuit parameters and their possible variations with temperature and saturation, are of no importance in synthesizing the current feedback circuit of FIG. 4. Of course, it is also seen from FIG. 2 that, for operation of induction motor near zero slip, i.e. for resistance $R_{rs}$ of very high value, the equivalent induction motor impedance of FIG. 2b becomes the equivalent synchronous motor impedance of FIG. 2a, as the rotor current referred to stator becomes negligible.

Various changes and modifications may be made within the scope of the inventive concept. For example, in deriving the algorithm for load independence of ac drive systems using FIG. 1, the standard system was shown with negative stator current feedback loop closed around stabilizing and control block, characterized by transfer function $G_R'(s)$, and PWM control and power stage, characterized by voltage gain A. In actuality, however, the negative stator current feedback loop is closed around PWM control and power stage only. This does not change the derived algorithm, as it can be easily shown, and Eq. (1), as the algorithm of the load invariance synthesis method, remains the same, while Eq. (8) is $$K_{cf}''(s) = -[Z_{ekv}(s)]/[AK_{cf}].$$

It was chosen to represent the standard system with negative stator current feedback loop closed as shown in FIG. 1 (dashed path) in order to show the independence of the algorithm, given by Eq. (1), from the control techniques, characterized by transfer function $G_R'(s)$, in a more explicit way.

As another example of a possible modification without departing from the scope of the inventive concept, one may realize current feedback circuit 142 in FIg. 1 by digital rather than analog means which have been used to illustrate possible realizations in case of synchronous motor (FIG. 3) and asynchronous motor (FIG. 4). Since digital means require A/D and D/A converters on both ends of the circuit, and since analog circuit implementations in FIGs. 3 and 4 are comparatively simpler (especially in FIG. 3), the microprocessor implementation of the current feedback circuit maybe justified in cases when possible motor parameter variations may be objectionable so that their on-line compensation can be relatively easily realized by digital means.

The algorithm for synthesis of load independent ac drive systems, as provided by Eq. (1) and shown in the preferred embodiment in FIG. 1, is functionally identical to the load invariance algorithms as described in the copending and coassigned application of Ljubomir Dj. Varga and Novica A. Losic, "Synthesis of Load-Independent Switch-Mode Power Converters", U.S. Pat. No. 4,885,674, and "Synthesis of Load-Independent DC Drive System", Ser. No. 323630.

We claim:

1. A method for synthesizing load independent alternating current drive system comprising:

accepting a source of electrical energy of a constant voltage at an input, coupling mechanically an alternating current synchronous motor shaft to a load to be drive at an output, controlling a power flow from said input to said output, modulating a power converter for the control of said power flow in a pulse width modulation control manner, supplying a total control signal for modulating said power converter, supplying position feedback pulses, feeding back side position feedback pulses in a negative feedback loop with respect to a position command pulses and comparing frequency and phase of the two pulse trains in a phase frequency detector; thereby producing a position error voltage signal proportional to a difference in frequency and phase between the two pulse trains, supplying a velocity feedback signal, feeding back said velocity feedback signal in a negative feedback loop with respect to a velocity command voltage and the position error signal and summing the three voltages, passing a signal obtained as the algebraic sum of the velocity feedback signal and the velocity command signal and the position error signal through a cascas connection of a filtering and stabilizing network and a control circuit; thereby producing a control signal proportional to the algebraic sum of the velocity command signal and the velocity feedback signal and the position error signal, sensing a current through an alternating current synchronous motor stator, feeding back the sensed current signal through a current feedback circuit in a positive feedback loop with respect to said control signal and summing the two signals, supplying said total control signal, obtained as the sum of said control signal and the current signal fed through said current feedback circuit, for modulating said power converter for the control of the flow of power from the input electrical source to the output mechanical load, whereby the alternating current synchronous motor shaft position and velocity is made independent of said load.

2. The method of claim 1 wherein said current feedback circuit in said positive feedback loop is synthesized using an equation providing transfer function in laplace domain of said current feedback circuit $$H(s) = [R_{st} + sL_{st}]/[R(R_4/R_3)A]$$

in said equation $R_{st}$ being a stator resistance per phase, $L_{st}$ being a synchronous inductance per phase consisting of a sum of a stator leakage inductance $L_{sl}$ and a magnetizing inductance $L_m$, R being a transresistance of a motor current sense device, $R_4/R_3$ being a gain of a buffering differential amplifier in a motor current sensing circuit, A being a voltage gain of a pulse width modulation control and power stage, and s being a complex frequency laplace variable in the transfer function H(s).

3. The method of claim 2 wherein said equation providing transfer function of said current feedback circuit is physically implemented, thereby implementing said current feedback circuit, as a differentiator circuit with a direct current path wherein said differentiator circuit with said direct current path is arranged to provide a differentiating time constant equal to $$L_{st}/[R(R_4/R_3)A]$$

and a direct current gain constant equal to $$R_{st}/[R(R_4/R_3)A],$$

$L_{st}$ being the synchronous inductance per phase consisting of the sum of the stator leakage inductance $L_{sl}$ and the magnetizing inductance $L_m$, R being the motor current sense device transresistance, $R_4/R_3$ being the gain of the buffering differential amplifier in the motor current sensing circuit, A being the overall voltage gain of the pulse width modulation stage, and $R_{st}$ being the stator resistance per phase.

4. A method for synthesizing load independent alternating current drive system comprising:
accepting a source of electrical energy of a constant voltage at an input,
coupling mechanically an alternating current asynchronous motor shaft to a load to be driven at an output,
controlling a power flow from said input to said output, modulating a power converter for the control of said power flow in a pulse width modulation control manner, supplying a total control signal for modulating said power converter,
supplying position feedback pulses,
feeding back said position feedback pulses in a negative feedback loop with respect to a position command pulses and comparing frequency and phase of the two pulse trains in a phase frequency detector; thereby producing a position error voltage signal proportional to a difference in frequency and phase between the two pulse trains,
supplying a velocity feedback signal,
feeding back said velocity feedback signal in a negative feedback loop with respect to a velocity command voltage and the position error signal and summing the three voltages, passing a signal obtained a the algebraic sum of the velocity feedback signal and the velocity command signal and the position error signal through a cascade connection of a filtering and stabilizing network and a control circuit; thereby producing a control signal proportional to the algebraic sum of the velocity command signal and the velocity feedback signal and the position error signal,
sensing a current through an alternating current asynchronous motor stator,
feeding back the sensed current signal through a current feedback circuit in a positive feedback loop with respect to said control signal and summing the two signals,
supplying said total control signal, obtained as the sum of said control signal and the current signal fed through said current feedback circuit, for modulating said power converter for the control of the flow of power from the input electrical source to the output mechanical load, wehreby the alternating current asynchronous motor shaft postion and velocity is made independent of said load.

5. The method of claim 4 wherein said current feedback circuit in said positive feedback loop is synthesized using an equation providing transfer function in laplace domain of said current feedback circuit $$H(s)=[R_{st}+sL_{st}]/[R(R_4/R_3)A]+[a_1s^2+a_2s]/[a_3s+1]$$

in said equation $R_{st}$ being a stator resistance per phase, $L_{st}$ being a stator leakage inductance per phase, R being a transresistance of a motor current sense device, $R_4/R_3$ being a gain of a buffering differential amplifier in a motor current sensing circuit, A being a voltage gain of a pulse width modulation control and power stage, $a_1$ being a parameter obtained as $$a_1=[L_mL_{rs}]/[R(R_4/R_3) AR_{rs}],$$

$L_m$ being a magnetizing inductance per phase, $L_{rs}$ being a rotor leakage inductance referred to stator per phase, $R_{rs}$ being a rotor fictitious resistance referred to stator per phase obtained as $$R_{rs}=R_{rs}'/s_l,$$

$R_{rs}'$ being a rotor resistance referred to stator per phase, $s_l$ being a slip of an asynchronous motor, $a_2$ being a parameter obtained as $$a_2=[L_m]/[R(R_4/R_3)A],$$

$a_3$ being a parameter obtained as $$a_3=[L_m+L_{rs}]/R_{rs},$$

and s being a complex frequency laplace variable in the transfer function H(s).

6. The method of claim 5 wherein said equation providing transfer function of said current feedback circuit is physically implemented, thereby implementing said current feedback circuit, as a parallel connection of a two signal processing circuits, the first of th two circuits processing a stator effects and physically implemented as a differentiator circuit with a direct current path wherein said differentiator circuit with said direct current path is arranged to provide a differentiating time constant equal to $$L_{st}/[R(R_4/R_3)A]$$

and a direct current gain constant equal to $$R_{st}/[R(R_4/R_3)A],$$

and the second of the two circuits processing a rotor effects and physically implemented as a cascade connection of a two circuits the first one of which being a parallel connection of a double differentiator circuit of a differentiating time constant of each of the two differentiators in said double differentiator circuit equal to $$\sqrt{[L_mL_{rs}]/[R(R_4/R_3)AR_{rs}]}$$

with a differentiator circuit of a differentiating time constant equal to $$[L_m]/[R(R_4/R_3)A]$$

and the second one of which being an integrator with a direct current path wherein said integrator with said direct current path is arranged to provide an integration time constant equal to $$[L_m + L_{rs}]/R_{rs}$$

and a direct current gain constant equal to one, whereby said parallel connection of said two signal processing circuits and said parallel connection of said double differentiator circuit and said differentiator circuit are each implemented summing the output as of the respective circuits in the respective parallel connections in a summing circuits, in the differentiating time constants and the direct current gain constant and the integration time constant $L_{st}$ being the stator leakage inductance per phase, R being the motor current senses device transresistance, $R_4/R_3$ being the gain of the buffering differential amplifier in the motor current sensing circuit, A being the overall voltage gain of the pulse width modulation stage, $R_{st}$ being the stator resistance per phase, $L_m$ being the magnetizing inductance per phase, $L_{rs}$ being the rotor leakage inductance referred to stator per phase, and $R_{rs}$ being the rotor fictitious resistance referred to stator per phase.

* * * * *